(12) United States Patent
Sano et al.

(10) Patent No.: US 11,047,989 B2
(45) Date of Patent: Jun. 29, 2021

(54) GNSS DEVICE

(71) Applicant: TOPCON CORPORATION, Tokyo (JP)

(72) Inventors: Naoki Sano, Tokyo (JP); Tohru Mogi, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 299 days.

(21) Appl. No.: 16/277,098

(22) Filed: Feb. 15, 2019

(65) Prior Publication Data

US 2019/0302273 A1 Oct. 3, 2019

(30) Foreign Application Priority Data

Mar. 30, 2018 (JP) .............................. JP2018-069155

(51) Int. Cl.

| | |
|---|---|
| *G01S 19/42* | (2010.01) |
| *G01S 19/23* | (2010.01) |
| *G01S 19/45* | (2010.01) |
| *G01S 19/14* | (2010.01) |
| *G01C 15/06* | (2006.01) |
| *G01C 9/02* | (2006.01) |
| *G01S 19/40* | (2010.01) |

(52) U.S. Cl.
CPC ............... *G01S 19/42* (2013.01); *G01C 9/02* (2013.01); *G01C 15/06* (2013.01); *G01S 19/14* (2013.01); *G01S 19/23* (2013.01); *G01S 19/45* (2013.01); *G01S 19/40* (2013.01)

(58) Field of Classification Search
CPC .......... G01S 19/14; G01S 19/42; G01S 19/23; G01S 19/45; G01S 19/28; G01S 19/24; G01S 19/09; G01S 5/0027; G01C 9/02; G01C 15/06
USPC ...................................................... 342/357.25
See application file for complete search history.

(56) References Cited

U.S. PATENT DOCUMENTS

2015/0276402 A1* 10/2015 Grasser ................. G01C 15/06
702/150
2020/0166338 A1* 5/2020 Pares Calaf ............ G01S 19/51

FOREIGN PATENT DOCUMENTS

| EP | 2487458 A2 | 8/2012 |
|---|---|---|
| JP | 2012-022596 A | 2/2012 |
| JP | 2012-0225696 A | 11/2012 |
| WO | 2014055428 A2 | 4/2014 |

\* cited by examiner

*Primary Examiner* — Harry K Liu
(74) *Attorney, Agent, or Firm* — Roberts Calderon Safran & Cole P.C.

(57) ABSTRACT

Usability of a GNSS device with a tilt sensor is improved. A GNSS device includes a tilt sensor capable of measuring a tilt, an electronic compass capable of measuring a direction, a GNSS antenna capable of acquiring positional information, and a display unit capable of displaying information, wherein when the tilt sensor or the electronic compass requests calibration for adjustment, an icon calling attention is displayed on a screen of the display unit, and when the icon is tapped by a user, the screen of the display unit shifts to a calibration screen. When calibration is required, immediate shifting to a calibration screen is enabled, so that high operability and usability are obtained.

7 Claims, 10 Drawing Sheets

Fig. 11A

With tilt correction ON

| Tilt angle | 0° ~ 15° | 15° ~ |
|---|---|---|
| Bubble 45A | Green | Red |
| Tilt correction | To be corrected | Not to be corrected (out of correction range) |

With tilt correction OFF

| Tilt angle | 0° ~ 15° | 15° ~ |
|---|---|---|
| Bubble 45A | Blue | Red |

Fig. 11B

With tilt correction ON

| Tilt angle | 0° ~ 5° | 5° ~ 10° | 10° ~ 15° | 15° ~ |
|---|---|---|---|---|
| Bubble 45A | ○ | ● | ● | ● |
| Tilt correction | To be corrected | | | Not to be corrected (out of correction range) |

GNSS DEVICE

TECHNICAL FIELD

The present invention relates to a GNSS device, particularly to a GNSS device with a tilt sensor.

BACKGROUND ART

In recent years, a GNSS device with a built-in tilt sensor has been used at survey sites.

For example, a device described in Patent Literature 1 includes an electronic tilt sensor, an imaging device, and a display unit, and displays, together with imaging data, a vertically lower position of the device from a tilt detected by the electronic tilt sensor on the display unit.

CITATION LIST

Patent Literature

Patent Literature 1: Japanese Published Unexamined Patent Application No. 2012-225696.

SUMMARY OF INVENTION

Technical Problem

However, a GNSS device with a built-in tilt sensor has been released in recent years, but has a problem that the display on the screen is difficult to understand and lacks operability.

The present invention was made in view of these circumstances, and an object thereof is to provide a GNSS device with an electronic tilt sensor which is high in operability and usability.

Solution to Problem

In order to attain the above-described object, a GNSS device according to an aspect of the present invention includes a tilt sensor capable of measuring a tilt, an electronic compass capable of measuring a direction, a GNSS antenna capable of acquiring positional information, and a display unit capable of displaying information, and is configured so that when the tilt sensor or the electronic compass requests calibration for adjustment, an icon calling attention is displayed on a screen of the display unit, and when the icon is tapped, the screen of the display unit shifts to a calibration screen.

According to this aspect, the screen can be immediately shifted to a calibration screen when necessary, so that high work efficiency and high usability are obtained.

Preferably, the display unit displays a tilt measured by the tilt sensor as an electronic bubble tube, and displays a bubble in the electronic bubble tube in a color corresponding to a level of the tilt measured by the tilt sensor.

According to this aspect, the degree of the tilt of the GNSS device can be judged by the color of the bubble, visibility and operator understanding are excellent, and the device is user-friendly.

Preferably, the tilt sensor and the GNSS antenna are attached to a pole, and the GNSS device has a correction function to calculate positional information of a ground-contact point of the pole from a tilt of the pole measured by the tilt sensor and an attaching height of the GNSS antenna based on positional information acquired by the GNSS antenna, and the display unit displays the electronic bubble tube with a bubble in a color different from when using the correction function and when not using the correction function.

According to this aspect, an operator can judge whether the correction function is ON or OFF at a glance.

Preferably, even while the GNSS antenna acquires positional information, when the tilt sensor or electronic compass requests calibration for adjustment, the icon calling attention is displayed on the display unit.

Even during acquisition of positional information, when calibration is necessary, such necessity is informed by being displayed, and in response to tapping, calibration can be performed immediately, so that wasteful operation is avoided, and the device becomes high in usability.

Advantageous Effects Of Invention

As is clear from the description above, according to the present invention, a GNSS device with a tilt sensor which is easy to operate and has high usability is provided.

BRIEF DESCRIPTION OF THE DRAWINGS

FIGS. 11A and 11B illustrate colors of a bubble in an electronic bubble tube.

DESCRIPTION OF EMBODIMENTS

Hereinafter, a detailed embodiment of the present disclosed configuration is described with reference to the drawings. The embodiment does not limit the invention but is an illustration, and all features described in the embodiment and combinations thereof are not necessarily essential of the invention.

Embodiment

Figure 1:
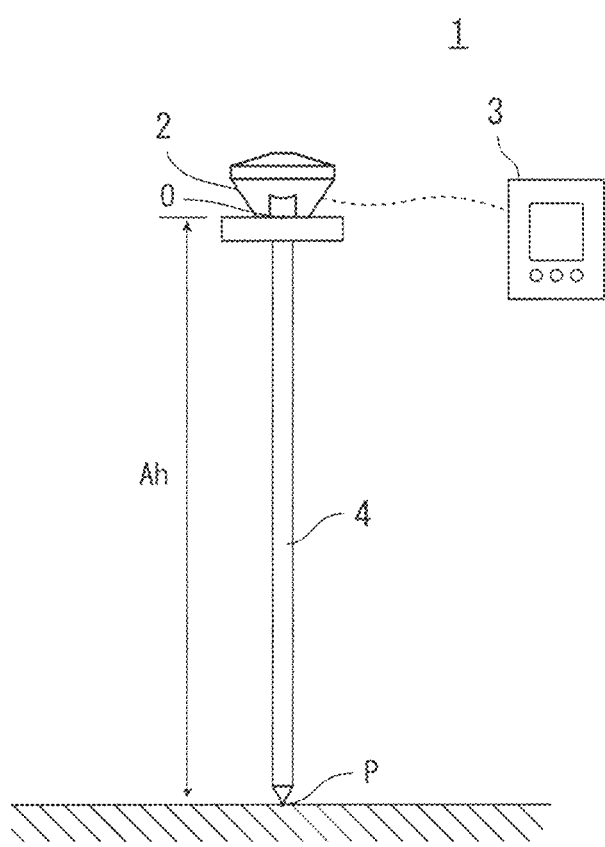
FIG. 1 is a schematic view of a GNSS device according to an embodiment.
Figure 2:
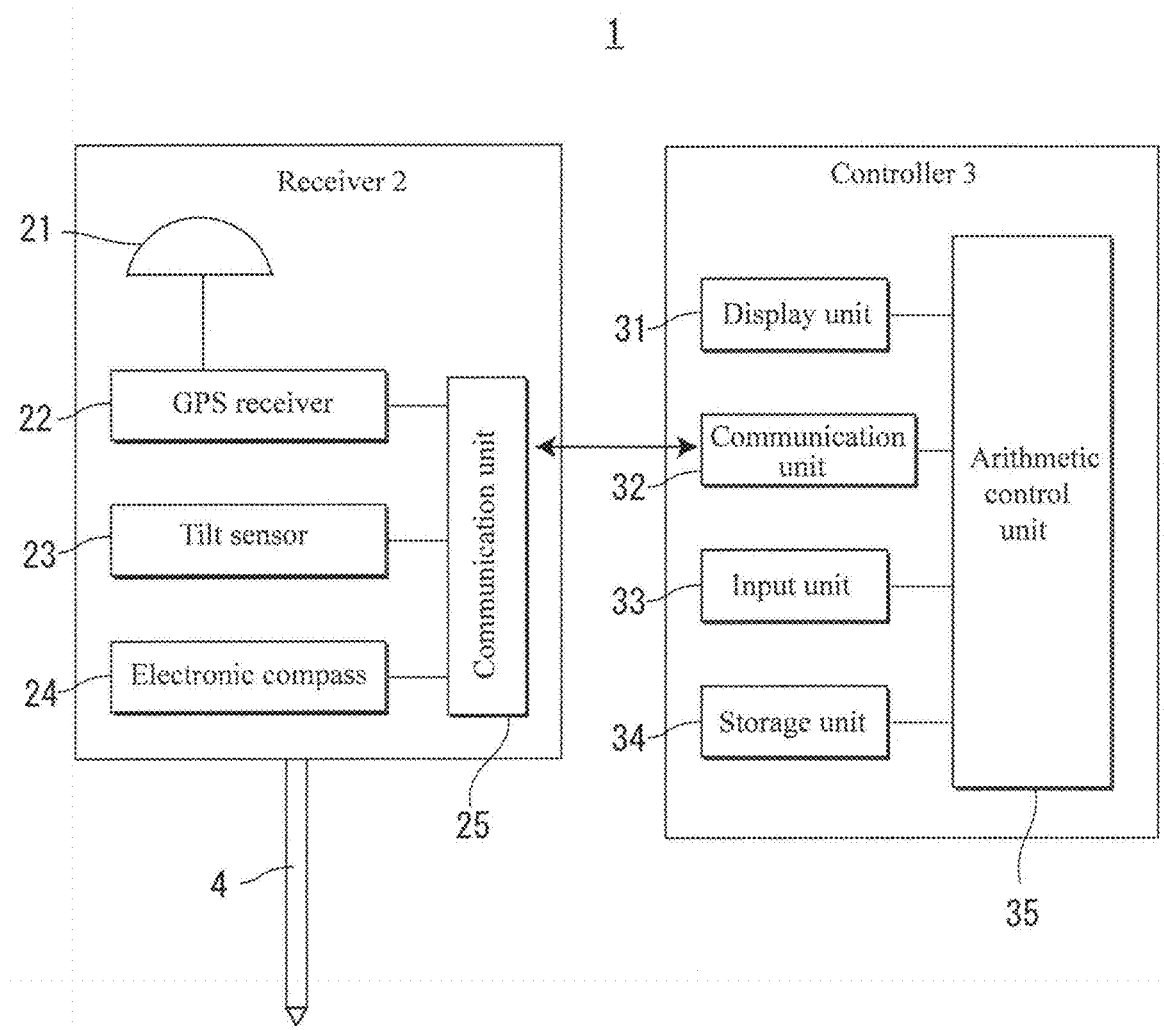
FIG. 2 is a block diagram of the same GNSS device.

FIG. 1 is a schematic view of a GNSS device 1 according to an embodiment of the present invention, and FIG. 2 is a block diagram of the GNSS device 1.

The GNSS device 1 is a positioning system using a GNSS (Global Navigation Satellite System). In the present embodiment, positioning is performed by using a GPS (Global Positioning System) as one of GNSS.

The GNSS device 1 includes a receiver 2, a controller 3, and a pole 4. The receiver 2 and the controller 3 are configured separately, and connected wirelessly or in a wired manner using a cable.

The pole 4 has a horizontal surface at an upper end, and a leg suspended from the horizontal surface. The receiver 2 is supported on a center (on the vertical line of a ground-contact point P) of the horizontal surface of the pole 4.

Receiver 2

The receiver 2 is a device to receive a signal transmitted from a GPS satellite, and includes a GNSS antenna 21, a GNSS receiver 22, a tilt sensor 23, an electronic compass 24, and a communication unit 25.

The GNSS antenna 21 is a device to receive radio waves, and receives a GPS signal transmitted from a GPS satellite, and inputs the received GPS signal into the GNSS receiver 22.

The GNSS receiver 22 converts a received radio wave (GPS signal) into an electric signal. The converted signal is input into the arithmetic control unit of the controller 3 via the communication unit 25 described later.

Figure 3:
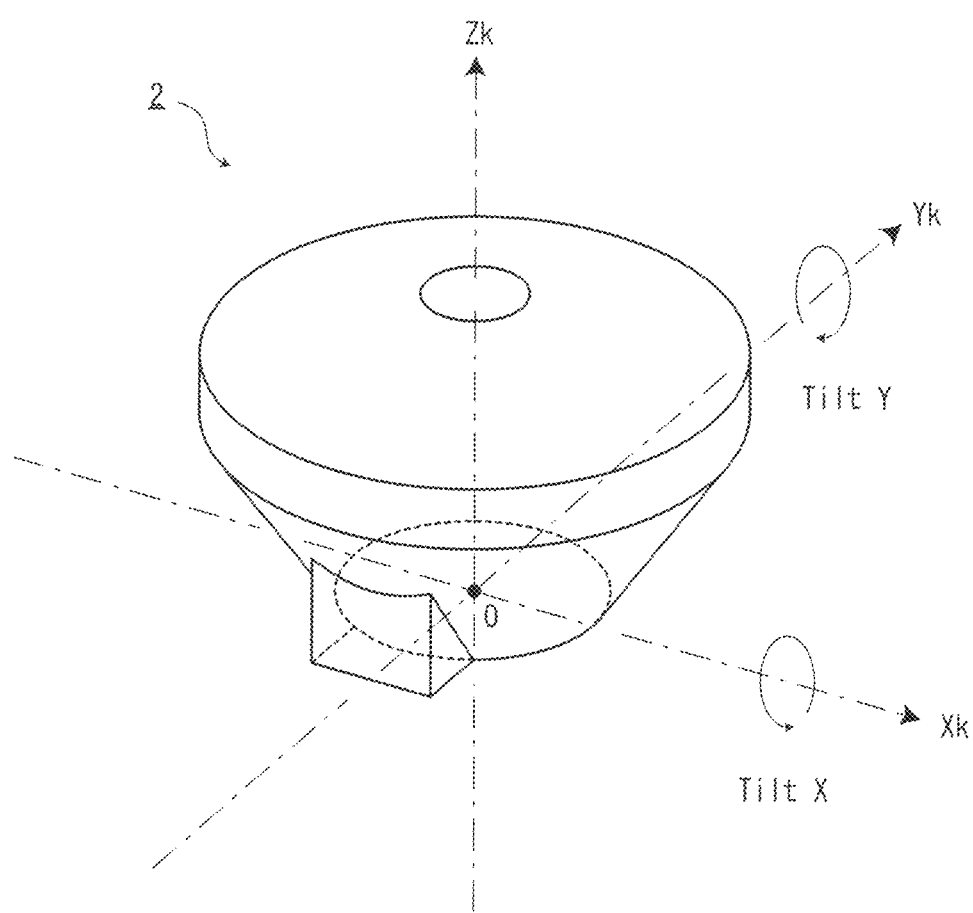
FIG. 3 is an explanatory view to describe axes and tilts of a receiver.

The tilt sensor 23 is a sensor to measure a tilt angle from a reference state. In the present embodiment, the tilt sensor 23 consists of an acceleration sensor capable of measuring an acceleration, and measures a gravity acceleration to measure a tilt. As illustrated in FIG. 3, a state where a bottom surface of the receiver 2 is placed horizontally on the horizontal surface (horizontal state) is set as a reference state, and a tilt Tilt X around a direction (around the Xk axis in FIG. 3) along the horizontal surface from the horizontal state of the receiver 2, and a tilt Tilt Y around another direction (around the Yk axis in FIG. 3) orthogonal to the one direction along the horizontal surface, can be measured. The tilt sensor is not limited to an acceleration sensor, and may consist of, for example, a gyro sensor, as long as it can measure a tilt angle.

The electronic compass 24 is a direction sensor using a semiconductor, and calculates a direction by detecting the north-south geomagnetism. Publicly-known electronic compasses using elements such as an MR element or a GMR element can be used regardless of the type of compass.

The communication unit 25 is a data transmitting/receiving device capable of making wireless communication with a communication unit 32 of the controller 3. The communication unit 25 transmits a GPS signal input into the GNSS receiver 22 and data measured by the tilt sensor 23 and the electronic compass 24 to the communication unit 32, and receives a command from the controller 3.

The tilt sensor 23 and the electronic compass 24 require calibration sometimes before use. The installed sensors are highly sensitive and easily influenced by magnetic fields and radio waves in the outside air. Therefore, these fields or waves may affect the sensitivity of sensors and make them go out of order, and to restore the sensors into normal states, fine adjustment (calibration) required. Due to the characteristics of the tilt sensor 23 and the electronic compass 24, calibration is required when starting the use of the receiver 2.

Controller 3

The controller 3 is a device to calculate three-dimensional positioning data from signals received by the receiver 2, and includes a display unit 31, the communication unit 32, an input unit 33, a storage unit 34, and an arithmetic control unit 35.

The display unit 31 and the input unit 33 are interfaces of the GNSS device 1. Inputs of various operation instructions can be made with the input unit 33, and settings of commands and confirmation of an observation status and operation results can be performed with the display unit. In the present embodiment, the display unit 31 is a touch-panel type, and an operator can input a command by tapping the screen, and the display unit 31 also serves as the input unit 33.

The communication unit 32 is a wireless data transmitting/receiving device like the communication unit 25, and can receive data from the communication unit 25 and transmit commands under control of the arithmetic control unit 35.

The arithmetic control unit 35 is, for example, a microcontroller with a CPU, a ROM, and a RAM, etc., mounted on an integrated circuit, and controls the entire GNSS device 1 such as execution of commands for the display unit 31, calculation of three-dimensional positioning data by using GPS signals received by the receiver 2, etc. There are various methods of calculating three-dimensional positioning data from GPS signals, and the methods are conventionally known, so that detailed description thereof is omitted. In the storage unit 34, various programs for the arithmetic processing described above are stored.

Tilt Correction

The arithmetic control unit 35 calculates highly accurate three-dimensional positioning data (coordinates) of an installation point of the receiver 2 (origin O in FIG. 3) from received GPS signals. However, the data is coordinates of the installation point of the receiver 2, and what should be calculated at a survey site in actuality is a ground-contact point P of the pole 4. Therefore, a correction value is obtained based on detection results of the tilt sensor 23 and the electronic compass 24, and the coordinates of the origin O are corrected to calculate coordinates of the ground-contact point P. Hereinafter, this correction is referred to as tilt correction.

FIG. 4 is an explanatory view to describe a method of calculating a correction value. To calculate a ground-contact point P (X', Y', Z') of the pole 4 from the coordinates (X, Y, Z) of the origin O of the receiver 2, first, from tilts (Tilt X) and (Tilt Y) measured by the tilt sensor 23 and a vertical height Ah of the pole 4, relative differences (dXk, dYk, dZk) on local coordinate axes of the receiver 2 are obtained.

Figure 4A:
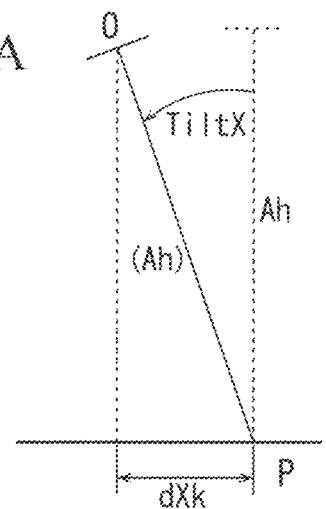
FIGS. 4A, 4B, 4C, 4D, 4E and 4F are an explanatory views illustrating a method of calculating a correction value.
Figure 4B:
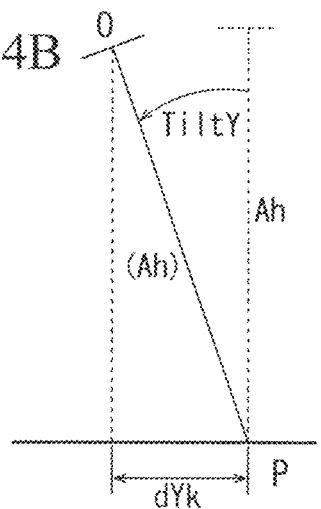

As illustrated in FIG. 4(A) and FIG. 4(B), $$dXk = Ah \times \sin(\text{Tilt } Y) \quad (1)$$

$$dYk = Ah \times \sin(-\text{Tilt } X) \quad (2)$$

Figure 4C:
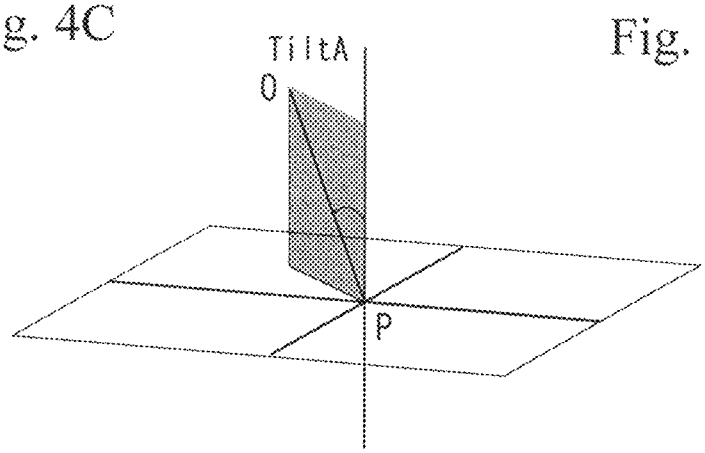
Figure 4D:
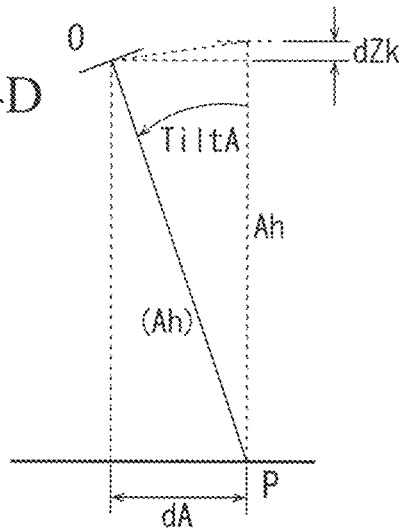

When a three-dimensional tilt angle of the pole 4 is Tilt A, and a difference is dA (refer to FIG. 4(C) and FIG. 4(D)), $$dA = \text{sqrt}(dXk \times dXk + dYk \times dYk) \quad (3)$$

$$\text{Tilt } A = A \sin(dA/Ah) \quad (4)$$

$$dZk = Ah - Ah \times \sin(\text{Tilt } A) \quad (5)$$

From above, relative differences (dXk, dYk, dZk) are obtained.

Next, by using a displacement angle T (a displacement angle between a direction of the axis Yk of the receiver 2 and an actual direction Y) measured by the electronic compass 24, the coordinate axes of the receiver 2 are rotated, and correction values (Xd, Yd, Zd) in a global coordinate system are obtained.

Figure 4E:
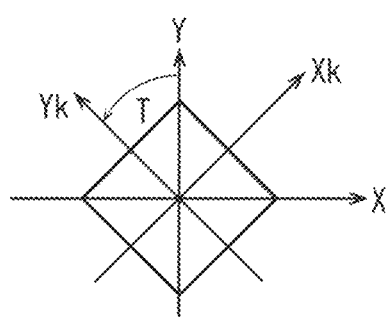
Figure 4F:
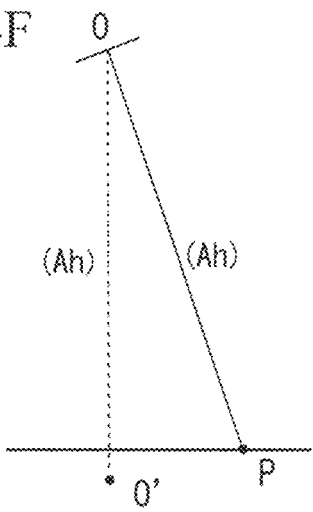

As illustrated in FIG. 4(E), $$Xd = dXk \times \cos(T) - dYk \times \sin(T) \quad (6)$$

$$Yd = dXk \times \sin(T) + dYk \times \cos(T) \quad (7)$$

$$Zd = dZk \quad (8)$$

Therefore, coordinates (X', Y', Z') of the ground-contact point P of the pole 4 are as follows.

$$X' = X - Xd \quad (9)$$

$$Y' = Y - Yd \quad (10)$$

$$Z' = Z + Zd \quad (11)$$

By using the calculation formula described above, tilt correction in which coordinates of the ground-contact point P of the pole 4 are calculated is performed.

When tilt correction is performed, as three-dimensional position data of the receiver 2, the ground-contact point P is displayed on the display unit 31. When tilt correction is not performed, a virtual origin O' (refer to FIG. 4(F)) hanging down by the vertical height Ah of the pole 4 from the origin O of the receiver 2 is displayed as three-dimensional position data.

Display Screen of Display Unit 31

FIG. 5 to FIG. 10 illustrate examples of display results of the display unit 31.

Figure 5:
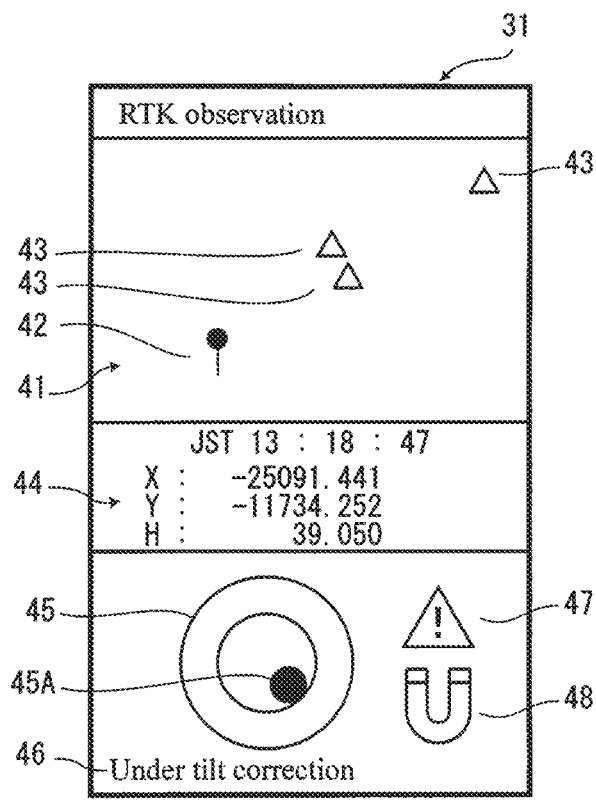
FIG. 5 is an example of a display screen of a display unit.

A screen area 41 in FIG. 5 shows a real-time kinematic (RTK) observation screen, and a triangular mark 43 denotes a known point, a pin mark 42 denotes the device's own observation point, and an operator can visually grasp a positional relationship. A screen area 44 shows three-dimensional position data (time JST and coordinates X, Y, H) of the receiver 2 measured from the receiver 2.

As three-dimensional position data in the screen area 44, display of calculated coordinates of the virtual origin O' of the receiver 2 and display of coordinates of the ground-contact point P of the pole 4 by tilt correction can be selectively performed. When tilt correction is performed, an indication 46 indicating "Under tilt correction" is displayed at a lower portion.

An icon 47 is displayed only when an abnormality or malfunction of the tilt sensor 23 is detected, and an icon 48 is displayed only when an abnormality or malfunction of the electronic compass 24 is detected, and both of these icons are to request calibration. By tapping the icon 47 or icon 48, the screen shifts to a calibration screen illustrated in FIG. 7.

In conventional screen display, even when a mark urging calibration is displayed, shifting to the calibration screen can be made only from a menu screen, so that it is required that the screen is returned to the menu screen once, and then by selecting calibration, the menu screen is shifted to the calibration screen, and this process is troublesome. Direct shifting to the calibration screen in response to tapping on the icon 47 or 48 is enabled, so that the operability is improved.

An electronic bubble tube 45 is displayed based on tilt data measured by the tilt sensor 23. When a bubble 45A is at the center, it means horizontal to a reference plane, and an operator can instinctively grasp a tilt state of the receiver 2. The bubble 45A of the electronic bubble tube 45 is displayed in a color that differs depending on the level of a tilt angle of the receiver 2 (pole 4). FIG. 11 illustrate examples of display of the bubble 45A. In tilt correction, a range of tilt angle to be subjected to tilt correction can be set, and for example, it is configured so that an upper limit of the range can be selected among 5°, 10°, and 15°, or a desired angle can be input. FIG. 11(A) and FIG. 11(B) illustrate a case where an upper limit of tilt correction is set to 15°.

As illustrated in FIG. 11(A), the bubble 45A is displayed in a color that differs from the inside and the outside of the range of the tilt correction. In a case of setting with tilt correction being ON, when the tilt angle is 0° or more and less than 15°, a green bubble 45A is displayed, and when the tilt angle is 15° or more, a red bubble 45A is displayed. By differing the color depending on whether the current tilt angle of the receiver 2 is out of the tilt correction range or within the tilt correction range, an operator can grasp a status at a glance.

Even in a case of setting with tilt correction being OFF, the same angle of 15° is used as a judgment criterion, and when the tilt angle is 0° or more and less than 15°, a blue bubble 45A is displayed, and when the tilt angle is 15° or more, a red bubble 45A is displayed. By differing the color of the bubble 45A depending on ON/OFF of setting of tilt correction, an operator can grasp the setting status at a glance. In the case of an excessive tilt angle (15° or more), a red bubble 45A is displayed in both of setting with tilt correction being ON and setting with tilt correction being OFF to call attention to an operator.

FIG. 11(B) illustrates another display example of the bubble 45A, and a tilt level is shown by changing a color density according to the level of a tilt of the receiver 2 (pole 4). The color of the bubble 45A is increased in density in increments of 5° of the tilt angle. When the tilt angle is in a range of 0° to 5°, the bubble has no color and is displayed as a white circle, and as the angle increases, the color density increases, and when the tilt angle reaches 15° or more and comes out of the range of tilt correction, the bubble is displayed as a black circle. An operator can grasp the level of the tilt angle based on a color density.

By the color of the bubble 45A, a user can judge the setting and status, and this configuration is high in visibility and user-friendly.

Figure 6:
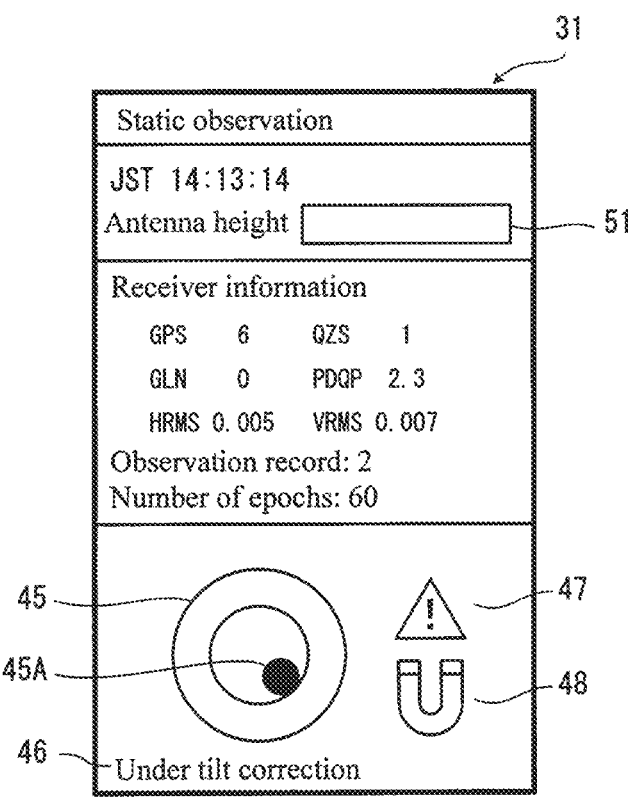
FIG. 6 is an example of the display screen of the display unit.

FIG. 6 illustrates a screen at the time of static observation, and a reception status such as the number of GPS satellites from which signals are received, and the number of epochs, etc., are displayed. In an input field 51, an antenna height, that is, a vertical height Ah of the pole 4 is input. On a screen in static observation as well, the electronic bubble tube 45 and the indication 46 are displayed at a lower portion, and when requesting calibration, the icon 47 or the icon 48 is displayed. Even during static observation, information calling for attention is recognized at a glance, so that recognizability is high, and in addition, shifting to a calibration screen is performed by tapping these icons (47, 48), so that operability is high.

Figure 7:
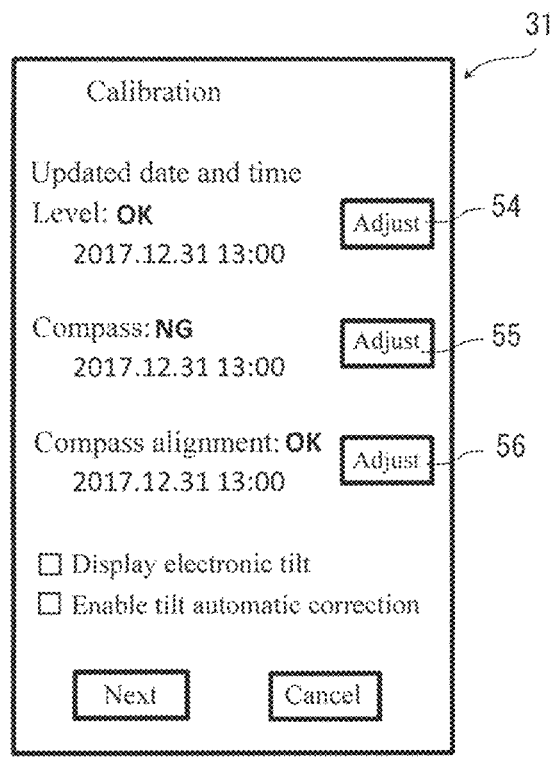
FIG. 7 is an example of the display screen of the display unit.

FIG. 7 illustrates a calibration screen showing level/compass/compass alignment conditions, and NG is displayed for an item that requires adjustment (for example, an item of the compass in the drawing) to call an operator's attention in a recognizable manner.

Figure 8:
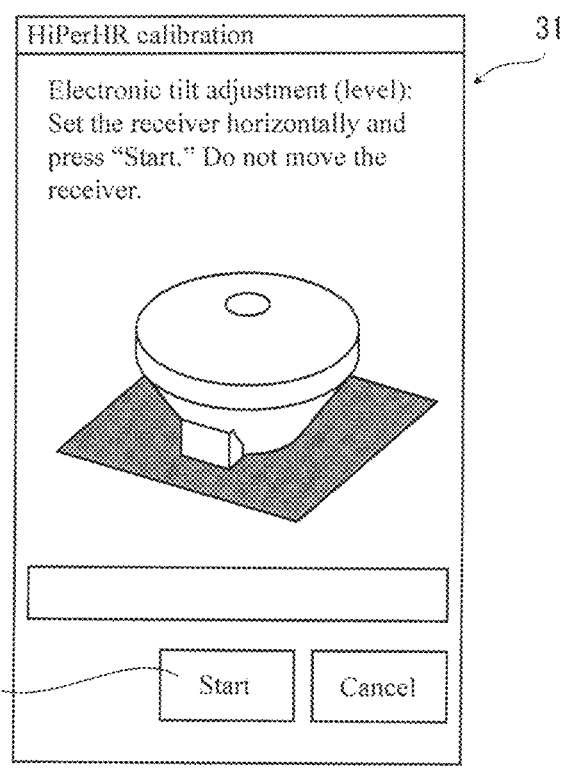
FIG. 8 is an example of the display screen of the display unit.
Figure 9:
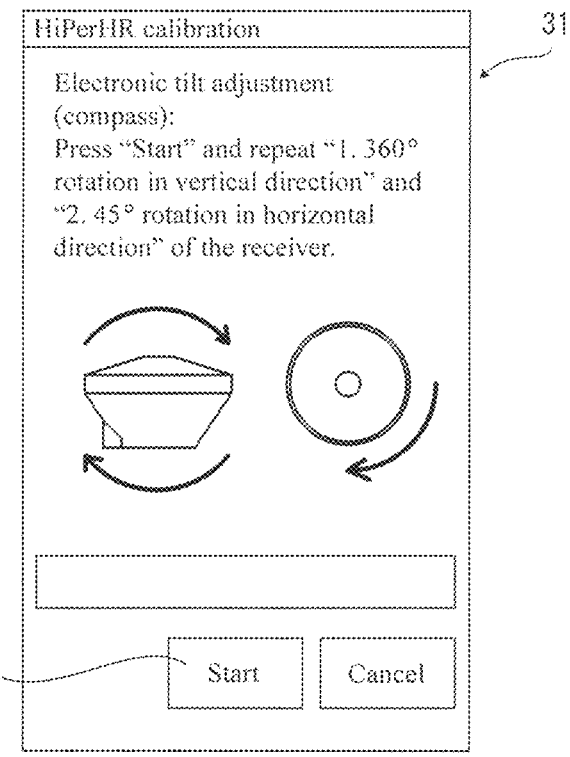
FIG. 9 is an example of the display screen of the display unit.
Figure 10:
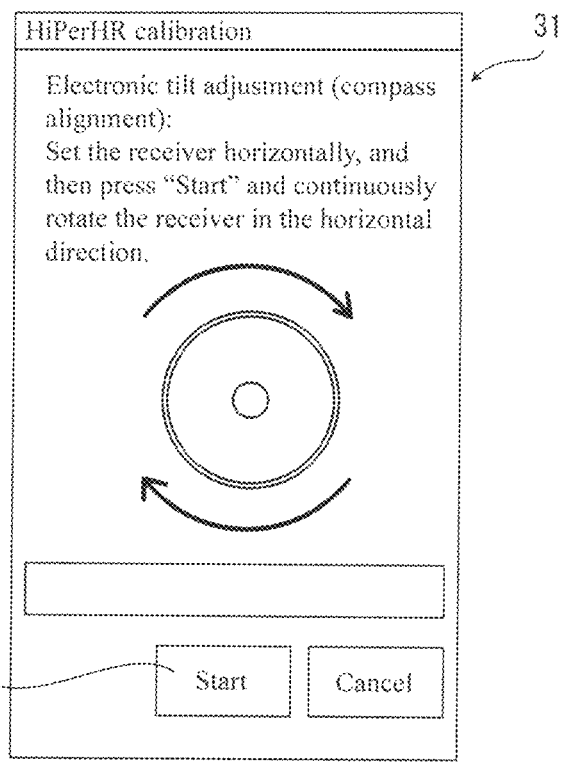
FIG. 10 is an example of the display screen of the display unit.

By tapping an "Adjust" button (54, 55, 56) for each item, the screen shifts to each calibration execution screen (FIG. 8, FIG. 9, FIG. 10). The calibration method differs for each item. A calibration method is described along with each calibration execution screen.

FIG. 8 illustrates a level calibration execution screen. In level calibration, an operator places the receiver 2 on the horizontal surface, and taps a start button 57. The receiver 2 does not need to be moved during execution of calibration, and calibration is automatically performed inside.

FIG. 9 illustrates a compass calibration execution screen. In compass calibration, an operator starts calibration by tapping a start button 58, and rotates the receiver 2 360° in the vertical direction (around the axis Xk), and subsequently, rotates the receiver 2 90° in the horizontal direction (around the axis Zk). 360° rotation in the vertical direction and 90° rotation in the horizontal direction are repeated 4 times.

FIG. 10 is a compass alignment calibration execution screen. In compass alignment calibration, first, an operator places the receiver 2 on the horizontal surface and taps the start button 59. The operator continuously rotates the receiver in the horizontal direction (around the axis Zk) until the calibration is completed.

In any case, when the operator performs each operation and calibration is successfully completed, OK is displayed on the screen, and by tapping this, the screen shifts to the calibration screen illustrated in FIG. 7. For items that have been successfully calibrated, OK is displayed.

Operation Flow

Figure 12:
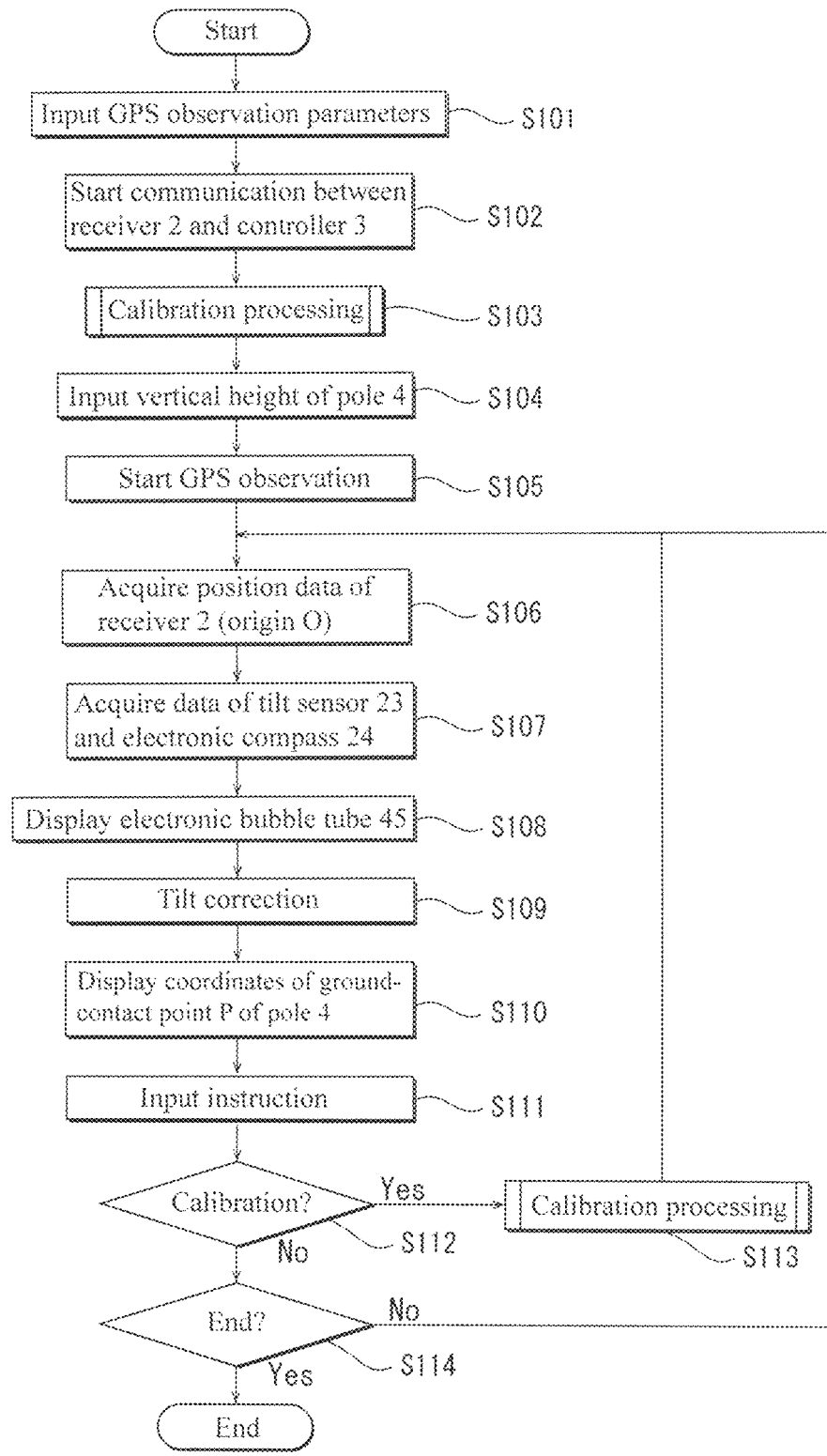
FIG. 12 is an operation flowchart of the GNSS device.
Figure 13:
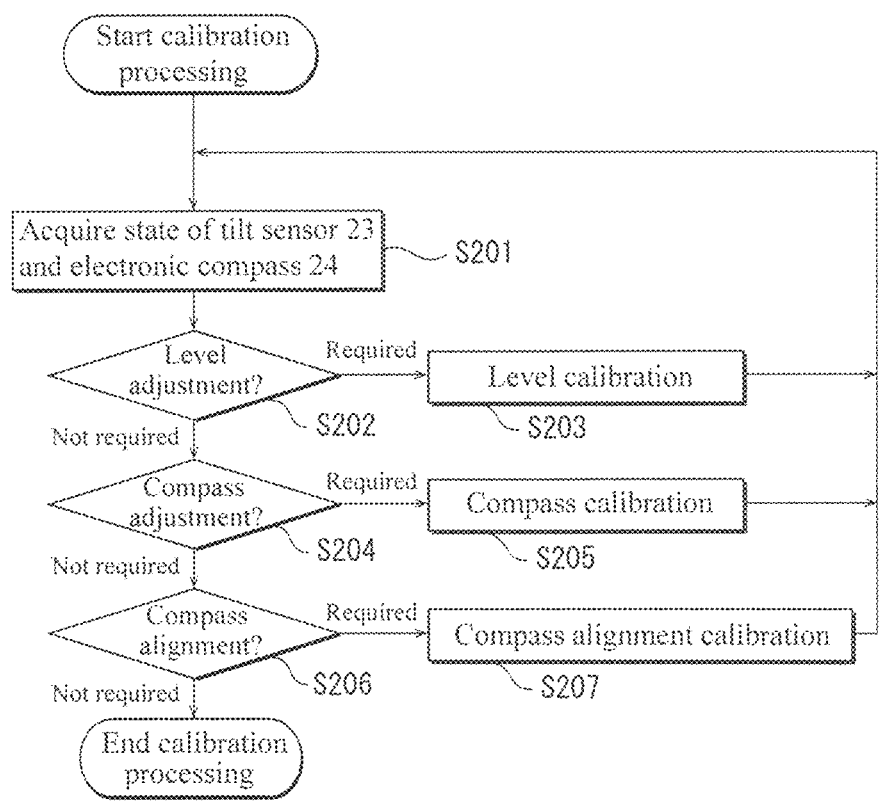
FIG. 13 is a flowchart of calibration processing.

Next, an operation flow of the GNSS device 1 is described with reference to FIG. 12 and FIG. 13.

First, in Step S101, an operator inputs settings of, for example, a tilt correction range, etc., and GPS observation parameters such as a kind of the GPS receiver, a kind of the antenna, and a kind of RTK observation processing from the input unit 33.

Next, in Step S102, the respective communication units of the receiver 2 and the controller 3 start communication, and items input in Step S101 are input as commands into the receiver 2 via each communication unit.

Next, in Step S103, calibration processing is executed.

The calibration processing is described in detail with reference to FIG. 13.

First, in Step S201, states of the tilt sensor 23 and the electronic compass 24 are acquired. The acquired states of the level/compass/compass alignment are displayed on the display unit 31 (refer to FIG. 7).

Next, in Step S202, when level adjustment is required, the processing shifts to Step S203, and when level adjustment is not required, the processing shifts to Step S204.

In Step S203, the operator performs level calibration (refer to FIG. 8). When the calibration is successively completed, this is displayed on the display unit 31, and the processing returns to Step S201.

Next, when compass adjustment is required in Step S204, the processing shifts to Step S205, and when compass adjustment is not required, the processing shifts to Step S206.

In Step S205, the operator performs compass calibration (FIG. 9). When the calibration is successfully completed, this is displayed on the display unit 31, and the processing returns to Step S201.

Next, in Step S206, when adjustment of compass alignment is required, the processing shifts to Step S207, and when the adjustment is not required, the calibration processing is ended.

In Step S207, the operator performs compass alignment calibration (refer to FIG. 10). When the calibration is successfully completed, this is displayed on the display unit 31, and the processing returns to Step S201.

Steps S201 to S207 are repeated until adjustments of the respective items become unnecessary. When adjustments of the respective items become unnecessary, the calibration processing is ended, and the processing returns to the original Step S103, and shifts to Step S104.

Next, in Step S104, a screen for static observation (refer to FIG. 6) is displayed on the display unit 31. In the input field 51, a vertical height Ah of the pole 4 is input as an antenna height.

Next, in Step S105, the receiver 2 starts signal reception from GPS satellites.

Next, in Step S106, the receiver 2 acquires GPS signals from GPS satellites, and the acquired GPS signals are transmitted to the controller 3.

The arithmetic control unit 35 calculates three-dimensional position data of the origin O of the receiver 2 setting position from the acquired GPS signals.

Next, in Step S107, the tilt sensor 23 measures a tilt of the receiver 2 (pole 4), and the electronic compass 24 measures a direction of the receiver 2, respectively. The measured data is transmitted to the controller 3.

Next, in Step S108, based on the data acquired in Step S107, the electronic bubble tube 45 is displayed on the display unit 31 (refer to FIG. 6). The bubble 45A is displayed in a bubble color based on the range of tilt correction input in Step S101 and the tilt angle measured in Step S107 (refer to FIG. 11).

Next, in Step S109, tilt correction is performed from the tilt angle of the pole 4 detected in Step S107 and the vertical height Ah of the pole 4 input in Step S104, and coordinates of the ground-contact point P of the pole 4 are calculated.

Next, in Step S110, the coordinates of the ground-contact point P of the pole 4 calculated in Step S109 are illustrated as the pin mark 42 in the screen area 41, and displayed as numeric values in the screen area 44 (refer to FIG. 5).

Next, in Step S111, the operator inputs instructions regarding recording of coordinate values, etc., from the controller 3.

Next, in Step S112, when calibration is performed voluntarily, or when the icon 47 or icon 48 is displayed and calibration is requested and performed, the processing shifts to Step S113, and when calibration is not performed or not requested, the processing shifts to Step S114.

In Step S113, when the operator taps each icon or instructs execution of calibration from the menu screen, the screen of the display unit 31 shifts to a calibration screen, and calibration processing starts. Like Step S103, Steps S201 to S207 are executed as calibration processing, and when the calibration processing is ended, the processing returns to Step S106.

In Step S114, when operation is continued for observation at the next observation point, etc., the processing returns to Step S106, and position data of a new observation point is acquired, and Steps S106 to S114 are repeated, and when the operation does not need to continue, the operation is ended.

By the configuration as described above, wasteful operations at the time of operation of the GNSS device 1 with the tilt sensor 23 are reduced, and operability is improved. In addition, visibility of various displays during operation is enhanced, and the interface is improved.

A preferred embodiment of the present invention is described above, however, the above-described embodiment is an example of the present invention, and can be modified based on knowledge of a person skilled in the art, and such modified embodiment is also included in the scope of the present invention.

REFERENCE SIGNS DEVICE

1 GNSS device
2 Receiver

3 Controller
4 Pole
21 GNSS antenna
23 Tilt sensor
24 Electronic compass
31 Display unit
45 Electronic bubble tube
45A Bubble
47 Icon
48 Icon
Ah Vertical height of pole 4

The invention claimed is:

1. A GNSS device comprising:
a tilt sensor configured to measure a tilt and to request calibration;
an electronic compass configured to measure a direction and to request calibration;
a GNSS antenna configured to acquire positional information; and
a display unit configured to display information,
wherein when the tilt sensor or the electronic compass requests calibration for adjustment, an icon urging calibration is displayed on a screen of the display unit, and when the icon is tapped, the screen of the display unit shifts directly to a calibration screen.

2. The GNSS device according to claim 1, wherein the display unit displays a tilt measured by the tilt sensor as an electronic bubble tube, and displays a bubble in the electronic bubble tube in a color corresponding to a level of the tilt measured by the tilt sensor.

3. The GNSS device according to claim 2, wherein the tilt sensor and the GNSS antenna are attached to a pole, and
the GNSS device has a correction function to calculate positional information of a ground-contact point of the pole from a tilt of the pole measured by the tilt sensor and an attaching height of the GNSS antenna based on positional information acquired by the GNSS antenna, and
the display unit displays the electronic bubble tube with a bubble in a color different from when using the correction function and when not using the correction function.

4. The GNSS device according to claim 1, wherein even while the GNSS antenna acquires positional information at the time of static observation, when the tilt sensor or electronic compass requests calibration for adjustment, the icon urging calibration is displayed on the display unit.

5. The GNSS device according to claim 2, wherein even while the GNSS antenna acquires positional information at the time of static observation, when the tilt sensor or electronic compass requests calibration for adjustment, the icon urging calibration is displayed on the display unit.

6. The GNSS device according to claim 3, wherein even while the GNSS antenna acquires positional information at the time of static observation, when the tilt sensor or electronic compass requests calibration for adjustment, the icon urging calibration is displayed on the display unit.

7. The GNSS device according to claim 1,
wherein during real-time kinematic (RTK) observation, as a RTK observation screen, the display unit displays marks denotes a known point and the GNSS device's own observation point, an electronic bubble tube with a bubble in a color corresponding to a level of the tilt measured by the tilt sensor, and the three-dimensional positioning data,
wherein, during the GNSS antenna acquires positional information at the time of RTK observation, when the tilt sensor or the electronic compass requests calibration for adjustment, an icon urging calibration is displayed on the display unit, the icon is tapped, the screen of the display unit shifts to a calibration screen.

* * * * *